United States Patent Office 2,885,378
Patented May 5, 1959

2,885,378

COMPOSITION CONTAINING HALOGENATED VINYLIDENE RESIN PLUS NON-VOLATILE LIQUID MONOPHENYL ALKANE PLASTICIZER

Joseph R. Darby, Webster Groves, Mo., assignor to Monsanto Chemical Company, St. Louis, Mo., a corporation of Delaware No Drawing. Application May 14, 1956
Serial No. 584,465

24 Claims. (Cl. 260—31.8)

This invention relates to a new and useful composition of matter comprising a primary plasticizer for halogen-containing vinylidene resins and a substantially non-volatile alkyl substituted monoaryl compound. In particular this invention relates to new and improved halogen-containing vinylidene resin compositions, which compositions upon fusing provide a stable continuous tack-free surface.

In accordance with this invention it has been found that a mixture comprising a primary plasticizer for halogen-containing vinylidene resins and a substantially non-volatile alkyl susbtituted monoaryl compound containing 14 to 24 carbon atoms, characterized by having an alkyl chain length attached to a ring carbon atom of the aryl nucleus of at least 6 and not more than 15 carbon atoms, is a highly useful paint remover, and additionally when admixed with a solid thermoplastic halogen-containing vinylidene resin and fused provides a stable continuous tack-free surface.

By "primary plasticizer" is meant those liquid chemical plasticizers which are active solvents for halogen-containing vinylidene resins which do not exude from the plasticized composition after frequent flexing or on long standing. Such liquids are well known in the art to which this invention appertains. The liquid phthalate ester plasticizers have been found to be particularly useful in the practice of the invention, and as illustrative of those contemplated are dibutyl phthalate, dihexyl phthalate, dicapryl phthalate, dioctyl phthalate, diisooctyl phthalate, di(2-ethylhexyl) phthalate, octyl decyl phthalate, didecyl phthalate, diisodecyl phthalate, butyl cyclohexyl phthalate, butyl benzyl phthalate, di(Cellosolve) phthalate, di(butyl Cellosolve) phthalate, monobutyl phthalyl butyl glycolate ester, monoethyl phthalyl ethyl glycoloate ester, and the like. Other liquid primary plasticizers contemplated by this invention are the phosphate ester plasticizers such as cresyl diphenyl phosphate, phenyl dicresyl phosphate, tricresyl phosphate, the liquid alkyl diaryl phosphates wherein the alkyl group contains 6 to 14 carbon atoms and the aryl groups are phenyl or cresyl or mixtures thereof, e.g. octyl diphenyl phosphate, 2-ethylhexyl diphenyl phosphate, dodecyl dicresyl phosphate, etc.; the liquid dialkyl aryl phosphates such as 2-ethylhexyl butyl phenyl phosphate, decyl isoamyl cresyl phosphate, etc.; and the liquid esters of dicarboxylic acids such as dibutyl sebacate, dihexyl adipate, di(butyl Cellosolve) adipate, di(1,3-dimethyl-butyl) adipate, dinonyl adipate, octyl decyl adipate, and the like. It is to be understood that the "primary plasticizer" of this invention excludes secondary plasticizers or extenders, as for example those of the hydrocarbon-type compounds.

The alkyl substituted monoaryl compounds or aryl alkanes of this invention in general will have a boiling point in excess of 200° C. A preferred aryl alkane of this invention is that obtained by condensing an aromatic hydrocarbon of the benzene series with a branched chain alkylating agent such as a branched chain olefin (or mixture of olefins) or a branched chain alkyl halide (or mixture of alkyl halides) containing 8 to 18 carbon atoms. A particularly useful and economical aryl alkane of this invention is keryl benzene obtained by mono-alkylating benzene with the product obtained by substantial mono-chlorination of paraffin base kerosene fractions. Such paraffin base kerosene fractions are obtained from Pennsylvania base oil and are often termed paraffin base kerosenes. In general such kerosene fractions distil between 150° C. and 300° C., but preferably in the range of 190° C. to 250° C., and contain 10 to 16 carbon atoms to the molecule and usually average 12 carbon atoms per molecule. As illustrative of another and particularly preferred aryl alkane of this invention is that obtained by condensing an aromatic hydrocarbon of the benzene series with an acyclic propylene polymer containing 9 to 18 carbon atoms, but preferably 12 to 18 carbon atoms. The major component of these propylene polymers is of the general structure

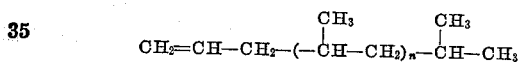

where $n$ is an integer from 1 to 4, inclusive. The propylene polymers upon condensing with an aromatic hydrocarbon, such as benzene or like members of the benzene series, provide a mixture of mono-alkylated products of which the major component may be represented by the following structural formula

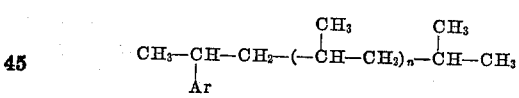

where Ar represents an aromatic nucleus derived from a member of the benzene series, such as phenyl, tolyl, and xylyl, and where $n$ is an integer from 1 to 4. The preparation of such aryl alkanes is well known and ordinarily is carried out at relatively low temperatures in the presence of anhydrous hydrofluoric acid, aluminum trichloride, boron trifluoride, or sulfuric acid.

The composition of this invention has been found to be particularly useful as a paint, varnish and lacquer film remover. The said films are readily removed from surfaces containing same by merely applying thereto the composition of this invention, which composition comprises 100 parts by weight of a primary plasticizer for a halogen-containing vinylidene resin admixed with 5 to 40 parts by weight of an aryl alkane as hereinbefore defined. By so applying to a surface the composition of this invention the film is loosened and then is removed by suitable mechanical means, as for example by scraping the surface with a scraping tool or by rubbing the surface with steel wool.

As aforementioned the composition of this invention is particularly useful in providing fused halogen-containing vinylidene resin compositions characterized by a stable tack-free continuous phase. With respect to such embodiment of this invention for each 100 parts by weight of the halogen-containing vinylidene resin there is admixed 25 to 100 parts by weight of a primary plasticizer for said resin and a compatible amount of an alkyl substituted monoaryl compound of this invention in the range of about 5% to about 40% by weight of the total primary plasticizer content.

The halogen-containing resins of this invention are those derived from such vinylidene compounds as vinyl chloride, vinylidene chloride, vinyl chloracetate, chlorostyrene, chlorobutadienes, etc., and those copolymers of such vinylidene compounds and other unsaturated materials copolymerizable therewith, for example, copolymers of a vinylidene halide such as vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example styrene, ortho-chlorostyrene, para-chlorostyrene, 2,5-dichlorostyrene, 2,4-dichlorostyrene, para-ethyl styrene, divinyl benzene, vinyl naphthalene, α-methyl styrene; dienes, such as butadiene, chlorobutadiene; unsaturated amides, such as acrylic acid amide, acrylic acid anilide; unsaturated nitriles, such as acrylic acid nitrile; esters of α,β-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids, and the like. The halogen-containing resins containing halogens other than chlorine, e.g. bromine, fluorine and iodine, are also operable in this invention. The halogen-containing resins may contain a varying proportion of halogen depending upon the nature of the resin and its contemplated use.

In order to illustrate this invention with respect to its narrower aspect the following compositions as set forth below are prepared by mixing a halogen-containing vinylidene resin with the indicated substances in the amounts set forth. The several ingredients are mixed on differential speed rolls at a roll temperature of 165° C. to form a homogeneous composition which is removed from the rolls, molded in a cavity mold at 165° C. to give a thin sheet, cooled, and the surface thereof noted for tackiness.

*Table I*

|  | (Parts by Weight) | | | | | | | |
|---|---|---|---|---|---|---|---|---|
|  | I | II | III | IV | V | VI | VII | VIII |
| Polyvinyl chloride | 100 | 100 | 100 | 100 | 100 | 100 | 100 | 100 |
| Di(2-ethylhexyl) phthalate | 50 |  | 50 | 37.5 |  | 40 |  | 37.5 |
| Butyl benzyl phthalate |  | 50 |  |  | 37.5 |  | 42 | 9.4 |
| Keryl benzene [1] |  |  | 10 |  |  |  |  |  |
| Monophenyl nonane [2] |  |  |  | 12.5 |  |  |  |  |
| Monophenyl dodecane [3] |  |  |  |  | 12.5 |  |  | 3.1 |
| Monophenyl pentadecane [4] |  |  |  |  |  | 10 |  |  |
| Monophenyl octadecane [5] |  |  |  |  |  |  | 8 |  |
| Dibasic lead stearate | 0.5 | 0.5 | 0.5 | 0.5 | 0.5 | 0.5 | 0.5 | 0.5 |
| Lead silicate—silica gel mix | 3 | 3 | 3 | 3 | 3 | 3 | 3 | 3 |
| Atomite (calcium carbonate) | 25 | 25 | 25 | 25 | 25 | 25 | 25 | 25 |
| Titanium dioxide | 10 | 10 | 10 | 10 | 10 | 10 | 10 | 10 |

[1] Obtained by condensing in substantially equimolecular proportions benzene and kerosene chloride obtained by introducing chlorine into a kerosene fraction until said fraction is substantially one-third to two-thirds chlorinated on a molar basis, said kerosene fraction boiling between 190° C. and 250° C. and consisting essentially of paraffinic hydrocarbons averaging 12 carbon atoms per molecule.

[2] Obtained by mono-alkylating benzene with a commercial propylene trimer (B.P. 107–144° C.) in the presence of BF₃ at room temperature. Analysis indicates that the nonyl substituent is principally

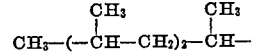

[3] Obtained by mono-alkylating benzene with a commercial propylene tetramer (B.P. 340–420° F.) in the presence of anhydrous hydrofluoric acid at room temperature. Analysis indicates that the dodecyl substituent is principally

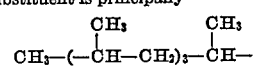

[4] Obtained by mono-alkylating benzene with a commercial propylene pentamer (B.P. 420–510° F.) in the presence of anhydrous hydrofluoric acid at room temperature. Analysis indicates that the pentadecyl substituent is principally

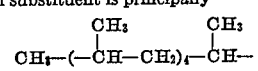

[5] Obtained by mono-alkylating benzene with a commercial propylene hexamer in the presence of boron trifluoride at room temperature. Analysis indicates the octadecyl substituent is principally

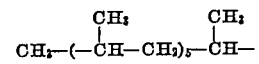

Compositions I and II are characterized by a sticky or tacky surface, whereas Compositions III, IV, V, VI, VII and VIII are characterized by a tack-free surface. The flex properties of Compositions I, II, III, IV, V, VI, VII and VIII are substantially identical. After standing for a relatively long period Compositions III, IV, V, VI, VII and VIII displayed no sign of exudation of the alkyl substituted monoaryl compounds.

This invention is concerned also with plastisols which are characterized by low viscosity build-up and when fused provide a stable tack-free continuous phase.

"Plastisol" is a term adapted by the art to which this invention appertains to designate a colloidal dispersion of halogen-containing vinylidene polymer of microscopic ultimate particle size in liquid plasticizers therefor. It is a 100% total solid material and is not to be confused with organosols, which contain volatile solvents or thinners.

Plastisols are prepared by dispersing a solid halogen-containing vinylidene polymer in a liquid plasticizer by means well known in the art, as for example by use of ordinary mixing equipment of the trade. At the same time pigments, fillers and like compounding materials are usually incorporated. The resultant compounded plastisols are of a viscous nature and in appearance vary from viscous liquids to pasty materials.

The plastisols are frequently employed in making hollow molded elastomeric articles of various wall thicknesses. This is accomplished either by placing the plastisol in a hollow mold or by dipping a one-piece mold into the plastisol. Plastisols are also employed in the "no-mold" molding technique, as for example in covering automotive light socket assemblies with a snug dust-and-water resistant removable cover by simply immersing the assembly in the plastisol to the proper depth. The plastisol coating resulting from any of these molding techniques is fused to an elastomeric compound by heating while in or on the mold. The usual fusion or fluxing temperature of plastisols is in the range of 300° F. to 400° F., the fusing or fluxing of the component parts of the plastisol is practically instantaneous. Upon cooling, the finished molded articles can be removed from the mold and are ready for use, or in case of a coated assembly, the assembly is ready for installation or packing.

It is apparent that for optimum use in molding, the plastisols must have an element of fluidity in order that they can be poured, sucked or pumped into molds or in order that they will flow around articles to be coated. Usually when freshly prepared, the viscous liquid plastisols, that is those containing about 60 to 100 parts by weight of plasticizers for each 100 parts by weight of resin, are sufficiently fluid so that they can be employed to filled molds or can be employed in the dip molding process. However, the viscosity of such liquid plastisols increases appreciably in but a few days after being prepared as hereinafter will be demonstrated. This increase in viscosity means that the plastisol can no longer be sucked or poured into molds or that a greatly increased power input is required to pump them into molds.

The pasty plastisols, that is those containing from about 25 to about 60 parts by weight of plasticizers per 100 parts of resin, are used in molding and also increase in viscosity on standing. Where they are used in dip molding, the pasty plastisols of increased viscosity produce a non-uniform and an uneven coating.

Since molding with a plastisol is intended to provide an inexpensive rapid method for molding elastomeric articles and to provide a method for producing a uniformly tailored molded protective coating at low cost, it is extremely important that the viscosity of the plastisol be maintained within reasonable usuable values even after the plastisol is seven to fourteen days old. When the viscosity of the plastisol increases beyond the usuable limit, it is apparent that the user thereof will suffer a loss or be put to additional expense in returning the plastisol to a usable material. Thus, it is readily apparent that a plastisol which does not change appreciably in viscosity even after being stored for as long as two weeks would be an exceedingly useful composition.

The above halogen-containing dispersion type resins and their preparation are well known in the art. They are usually prepared by a conventional aqueous emulsion polymerization which produces a latex-like dispersion of the halogen-containing resin. The polymeric material is recovered from the latex-like dispersion by a coagulation or flocculation process as a fine powder wherein usually 95% of the particles are within ±0.05 micron of the mean particle size. Halogen-containing dispersion type resins having an average particle size in a wide range, as for example from about 0.05 to about 200 microns, may be employed in practicing this invention, however, the use of powdery halogen-containing resins having an average particle size of from 0.05 to about 30 microns is preferred. Powdery dispersion type resins having a particle size less than 0.05 micron tend to dissolve readily in the plasticizer and cause the plastisol to gel. Powdery dispersion resins having an average particle size greater than about 30 microns tend to form grainy plastisols.

As illustrative of this invention with respect to plastisols but not limitative thereof is the following:

Plastisol compositions are prepared by stirring together in weight proportions set forth below a dispersion type halogen-containing resin having an average particle size of 2.29 microns, a liquid primary plasticizer therefor, monophenyl dodecane [obtained by mono-alkylating benzene with a commercial propylene tetramer, B.P. 340–420° F., in the presence of anhydrous hydrofluoric acid at room temperature. Analysis indicates that the dodecyl substituent is principally

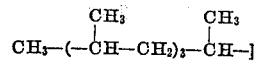

and several other ingredients tabulated below.

Table II

| Composition | (Parts by weight) | | | |
|---|---|---|---|---|
| | IX | X | XI | XII |
| Polyvinyl chloride | 160 | 160 | 160 | 160 |
| Diisodecyl phthalate | 60 | 65 | 75 | 80 |
| Cresyl diphenyl phosphate | 20 | | 20 | |
| Butyl benzyl phthalate | 20 | 52.5 | 20 | 26.3 |
| Polyethyl benzene [1] | 35 | | | |
| Epoxidized soybean oil | 5 | 5 | 5 | 5 |
| Ba, Cd complex commercial light stabilizer | 7 | 7 | 7 | 7 |
| Atomite (CaCO₃) | 25 | 25 | | |
| Pigment | 2 | 2 | 2 | 2 |
| Monophenyl dodecane | | 17.5 | | 8.7 |

[1] A hydrocarbon consisting of 85% polyethylated benzene and 15% polyphenylated ethanes.

The viscosity of the compositions set forth above at 25° C. and 40° C. obtained on the Brookfield Model LVF viscometer using the No. 4 spindle at 12 r.p.m. in poises on standing is at follows for the listed periods of time:

Table III

| Composition | r.p.m. | IX | X | XI | XII |
|---|---|---|---|---|---|
| 2 hours at 23° C | 12 | 33 | 29 | 59 | 36 |
| 1 day at 23° C | 12 | 36 | 33 | 57 | 33 |
| 7 days at 23° C | 12 | 198 | 39 | 114 | 32 |
| 14 days at 23° C | 12 | 227 | 80 | 257 | 33 |
| 28 days at 23° C | 12 | 349 | 92 | 400 | 47 |
| 2 hours at 40° C | 12 | 30 | 19 | 38 | 25 |
| 1 day at 40° C | 12 | 67 | 54 | 137 | 72 |
| 7 days at 40° C | 12 | 300 | 163 | 379 | 114 |

Upon molding the respective plastisol compositions IX, X, XI and XII the finished products prepared from Compositions X and XII are characterized by a tack-free surface, whereas the surfaces of the finished molded products from Compositions IX and XI are noticeably tacky or sticky.

To further illustrate the unique properties of the compositions of this invention, plastisol compositions are prepared by stirring together in weight proportions set forth below a dispersion type halogen-containing vinylidene resin having an average particle size of 2.29 microns, a liquid plasticizer, and a hydrocarbon.

| | A | B | C | D | E | F | G | H | I | J | K | L | M | N | O | P | Q | R | S | T |
|---|---|---|---|---|---|---|---|---|---|---|---|---|---|---|---|---|---|---|---|---|
| Polyvinyl chloride | 100 | 100 | 100 | 100 | 100 | 100 | 100 | 100 | 100 | 100 | 100 | 100 | 100 | 100 | 100 | 100 | 100 | 100 | 100 | 100 |
| Di(2-ethylhexyl) phthalate | 80 | 78 | 75 | 70 | 60 | | | | | | | 60 | 70 | | 70 | | 70 | | | |
| Butyl benzyl phthalate | | | | | | 80 | 78 | 75 | 70 | 60 | 70 | | | 75 | | 70 | | 70 | 20 | 20 |
| Monophenyl dodecane [a] | | 2 | 5 | 10 | 20 | | 2 | 5 | 10 | 20 | | | | | | | | | | |
| Commercial mixture of didodecyl benzenes and biphenyls | | | | | | | | | | | 10 | | | | | | | | | |
| Isopropyl biphenyl | | | | | | | | | | | | 20 | | | | | | | | |
| HB-40* [b] | | | | | | | | | | | | | 10 | | | | | | | |
| Monowax substituted benzene | | | | | | | | | | | | | | 5 | | | | | | |
| Monophenyl pentadecane [c] | | | | | | | | | | | | | | | 10 | 10 | | | | |
| Monophenyl octadecane [d] | | | | | | | | | | | | | | | | | 10 | 10 | | |
| 2-ethylhexyl diphenyl phosphate | | | | | | | | | | | | | | | | | | | 60 | |
| Dioctyl adipate | | | | | | | | | | | | | | | | | | | | 60 |

[a] Obtained by condensing benzene with a commercial propylene tetramer (B.P. 340–420° F.) in the presence of anhydrous hydrofluoric acid at room temperature. Analysis indicates that the dodecyl substituent is principally

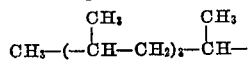

[b] Partially hydrogenated mixture of isomeric terphenyls.

[c] Obtained by condensing benzene with a commercial propylene pentamer (B.P. 420–510° F.) in the presence of anhydrous hydrofluoric acid at room temperature. Analysis indicates that the pentadecyl substituent is principally

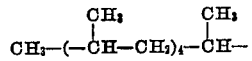

[d] Obtained by condensing benzene with a commercial propylene hexamer in the presence of boron trifluoride at room temperature. Analysis indicates the octadecyl substituent is principally

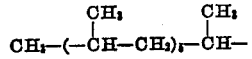

\* Registered trademark of Monsanto Chemical Company.

Upon casting the aforedescribed plastisols as films, those provided by Compositions C, D, E, H, I, J, O, P, Q, R, S, and T were noticeably tack-free, whereas those films provided by Compositions A, F, K, L, M, and N were very tacky on their respective surfaces. Compositions B and G were slightly tacky. On standing the films provided by Compositions C, D, E, H, I, J, O, P, Q, R, S, and T showed no signs of exudation of the aryl alkane component.

While in the instant invention the substantially nonvolatile alkyl substituted monoaryl compound has been described with respect to its certain embodiments, namely the aryl alkanes obtained by condensing benzene with a mono-chloride of a paraffin base kerosene fraction or preferably by condensing benzene with a propylene polymer containing 9 to 18 carbon atoms with benzene, which respectively provide a monophenyl branched chain alkane containing a carbon atom content in the range of 14 to 24 carbon atoms and characterized by a carbon atom chain length attached to a ring carbon atom of the aryl nucleus of 6 to 12 carbon atoms, it is to be understood that the invention is not so limited. The class of aryl alkanes operable in the instant invention are those of the structure

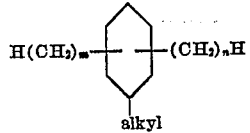

wherein m and n are integers from 0 to 1, and preferably 0, and where the alkyl substituent is branched or straight chain and contains 8 to 18 carbon atoms, which alkyl substituent is characterized by a carbon atom chain length attached to a ring carbon atom of the aryl nucleus of at least 6 and not more than 15. As illustrative of such aryl alkanes are 1-phenyl-3,6-dimethyl hexane, 1-phenyl-4,6-dimethyl heptane, 2-phenyl-4,6-dimethyl heptane, 2-phenyl-4,6,8-trimethyl nonane, 2-phenyl-4,6-dimethyl nonane, isodecyl benzene, 1-phenyl-4,6,8-trimethyl decane, 2-phenyl-4,6-dimethyl decane, 2-phenyl-4,6,8,10-tetramethyl undecane, 1-phenyl-4,6,8,10-tetramethyl undecane, n-dodecyl benzene, isododecyl benzene, 1-phenyl-4,6,8-trimethyl dodecane, 2-phenyl-4,6,8,10,12-pentamethyl tridecane, n-tetradecyl benzene, isotetradecyl benzene, 2-phenyl-4,6,8,10-tetramethyl-tetradecane, 1-phenyl-4,6,8,10-tetramethyl tetradecane, 1-phenyl-4,6,8-trimethyl pentadecane, 2-phenyl-4,6,8-trimethyl pentadecane, and the like, and mixtures thereof.

Although any compatible amount of an aryl alkane of this invention within the range of 5% to 40% by weight of the total primary plasticizer content may be employed, it is preferred that a compatible amount in the range of 8 to 30% by weight be employed.

While this invention has been described with respect to certain embodiments, it is not so limited and it is to be understood that variations and modifications thereof may be made without departing from the spirit or scope of this invention.

What is claimed is:

1. A composition which upon fusing provides a stable continuous tack-free surface comprising a solid thermoplastic halogen-containing vinylidene resin, and for each 100 parts by weight of said resin 25 to 100 parts by weight of a primary liquid plasticizer for said resin, and a compatible amount in the range of 5 to 40% by weight of the said primary liquid plasticizer of a substantially non-volatile alkyl substituted monoaryl compound containing 14 to 24 carbon atoms characterized by having an alkyl chain length of at least 6 and not more than 15 carbon atoms, the aryl substituent of said alkyl substituted monoaryl compound being an aromatic hydrocarbon radical obtained upon replacement of one hydrogen substituent of a ring carbon atom of a member of the benzene series of the structure

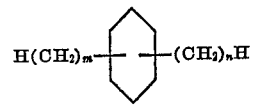

where m and n are integers from 0 to 1.

2. A composition which upon fusing provides a stable continuous tack-free surface comprising a solid thermoplastic halogen-containing vinylidene resin, and for each 100 parts by weight of said resin 25 to 100 parts by weight of a liquid phthalate primary plasticizer for said resin, and a compatible amount in the range of 5 to 40% by weight of the said liquid phthalate plasticizer of a substantially non-volatile alkyl substituted monoaryl compound containing 14 to 24 carbon atoms characterized by having an alkyl chain length of at least 6 and not more than 15 carbon atoms, the aryl substituent of said alkyl substituted monoaryl compound being an aromatic hydrocarbon radical obtained upon replacement of one hydrogen substituent of a ring carbon atom of a member of the benzene series of the structure.

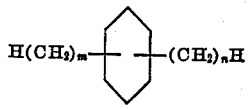

where $m$ and $n$ are integers from 0 to 1.

3. A composition which upon fusing provides a stable continuous tack-free surface comprising a solid thermoplastic chlorine-containing vinylidene resin, and for each 100 parts by weight of said resin 25 to 100 parts by weight of a liquid phthalate primary plasticizer for said resin, and a compatible amount in the range of 8 to 30% by weight of the said liquid phthalate primary plasticizer of a substantially non-volatile monophenyl alkane obtained by condensing a branched chain propylene polymer containing 9 to 18 carbon atoms with benzene.

4. A composition which upon fusing provides a stable continuous tack-free surface comprising a solid thermoplastic chlorine-containing vinylidene resin, and for each 100 parts by weight of said resin 25 to 100 parts by weight of di(2-ethylhexyl) phthalate and 8 to 30% by weight of the said phthalate of monophenyl dodecane obtained by condensing a branched chain propylene tetramer with benzene.

5. A composition which upon fusing provides a stable continuous tack-free surface comprising a solid thermoplastic chlorine-containing vinylidene resin, and for each 100 parts by weight of said resin 25 to 100 parts by weight of butyl benzyl phthalate and 8 to 30% by weight of the said phthalate of monophenyl dodecane obtained by condensing a branched chain propylene tetramer with benzene.

6. A composition which upon fusing provides a stable continuous tack-free surface comprising a solid thermoplastic chlorine-containing vinylidene resin, and for each 100 parts by weight of said resin 25 to 100 parts by weight of di(2-ethylhexyl) phthalate and 8 to 30% by weight of the said phthalate of monophenyl pentadecane obtained by condensing a branched chain propylene pentamer with benzene.

7. A composition which upon fusing provides a stable continuous tack-free surface comprising a solid thermoplastic chlorine-containing vinylidene resin, and for each 100 parts by weight of said resin 25 to 100 parts by weight of di(2-ethylhexyl) phthalate and 8 to 30% by weight of the said phthalate of keryl benzene obtained by condensing in substantially equimolecular proportions benzene and kerosene chloride prepared by introducing chlorine into a paraffinic kerosene fraction until said fraction is substantially one-third to two-thirds chlorinated on a molar basis, said kerosene fraction boiling between 190° C. and 250° C. and consisting essentially of paraffinic hydrocarbons averaging 12 carbon atoms per molecule.

8. The composition of claim 3 wherein the chlorine-containing vinylidene resin is polyvinyl chloride.

9. The composition of claim 4 wherein the chlorine-containing vinylidene resin is polyvinyl chloride.

10. The composition of claim 5 wherein the chlorine-containing vinylidene resin is polyvinyl chloride.

11. The composition of claim 6 wherein the chlorine-containing vinylidene resin is polyvinyl chloride.

12. The composition of claim 7 wherein the chlorine-containing vinylidene resin is polyvinyl chloride.

13. The composition of claim 8 wherein the polyvinyl chloride resin is one of particle size in the range of about 0.05 microns to about 200 microns.

14. The composition of claim 9 wherein the polyvinyl chloride resin is one of particle size in the range of about 0.05 microns to about 200 microns.

15. The composition of claim 10 wherein the polyvinyl chloride resin is one of particle size in the range of about 0.05 microns to about 200 microns.

16. The composition of claim 11 wherein the polyvinyl chloride resin is one of particle size in the range of about 0.05 microns to about 200 microns.

17. The composition of claim 12 wherein the polyvinyl chloride resin is one of particle size in the range of about 0.05 microns to about 200 microns.

18. A composition of matter comprising 100 parts by weight of a primary liquid plasticizer for halogen-containing vinylidene resins and 5 to 40 parts by weight of a substantially non-volatile alkyl substituted monoaryl compound containing 14 to 24 carbon atoms characterized by having an alkyl chain length of at least 6 and not more than 15 carbon atoms, the aryl substituent of said alkyl substituted monoaryl compound being an aromatic hydrocarbon radical obtained upon replacement of one hydrogen substituent of a ring carbon atom of a member of the benzene series of the structure

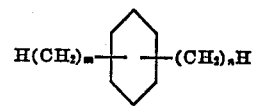

where $m$ and $n$ are integers from 0 to 1.

19. A composition of matter comprising 100 parts by weight of a primary liquid phthalate plasticizer for halogen-containing vinylidene resins and 5 to 40 parts by weight of a substantially non-volatile alkyl substituted monoaryl compound containing 14 to 24 carbon atoms characterized by having an alkyl chain length of at least 6 and not more than 15 carbon atoms, the aryl substituent of said alkyl substituted monoaryl compound being an aromatic hydrocarbon radical obtained upon replacement of one hydrogen substituent of a ring carbon atom of a member of the benzene series of the structure

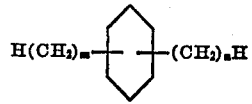

where $m$ and $n$ are integers from 0 to 1.

20. A composition of matter comprising 100 parts by weight of a liquid phthalate primary plasticizer for halogen-containing vinylidene resins and 5 to 40 parts by weight of a substantially non-volatile monophenyl alkane obtained by condensing a branched chain propylene polymer containing 9 to 18 carbon atoms with benzene.

21. The composition of claim 20 wherein the liquid phthalate primary plasticizer is di(2-ethylhexyl) phthalate.

22. The composition of claim 20 wherein the liquid phthalate primary plasticizer is butyl benzyl phthalate.

23. The composition of claim 20 wherein the liquid phthalate primary plasticizer is diisodecyl phthalate.

24. A composition of matter comprising 100 parts by weight of butyl benzyl phthalate and 5 to 40 parts by weight of keryl benzene obtained by condensing in substantially equimolecular proportions benzene and kerosene chloride prepared by introducing chlorine into a paraffinic kerosene fraction until said fraction is substantially one-third to two-thirds chlorinated on a molar basis, said kerosene fraction boiling between 190° C. and 250° C. and consisting essentially of paraffinic hydrocarbons averaging 12 carbon atoms per molecule.

References Cited in the file of this patent
UNITED STATES PATENTS
2,477,717   Brandt _____ Aug. 2, 1949